(12) United States Patent
   Tsuno

(10) Patent No.: US 10,845,113 B2
(45) Date of Patent: Nov. 24, 2020

(54) TRANSPORT CONTAINER

(71) Applicant: FUJIFILM Toyama Chemical Co., Ltd., Tokyo (JP)

(72) Inventor: Katsuhiro Tsuno, Tokyo (JP)

(73) Assignee: FUJIFILM TOYAMA CHEMICAL CO., LTD., Tokyo (JP)

( * ) Notice: Subject to any disclaimer, the term of this patent is extended or adjusted under 35 U.S.C. 154(b) by 77 days.

(21) Appl. No.: 16/300,240

(22) PCT Filed: Mar. 15, 2017

(86) PCT No.: PCT/JP2017/010419
§ 371 (c)(1),
(2) Date: Nov. 9, 2018

(87) PCT Pub. No.: WO2017/195461
PCT Pub. Date: Nov. 16, 2017

(65) Prior Publication Data
US 2019/0145688 A1 May 16, 2019

(30) Foreign Application Priority Data
May 12, 2016 (JP) ................. 2016-096041

(51) Int. Cl.
   *F25D 3/06* (2006.01)
   *B65D 81/18* (2006.01)
   (Continued)

(52) U.S. Cl.
   CPC ............. *F25D 3/06* (2013.01); *A01N 1/0273* (2013.01); *B65D 81/18* (2013.01); *B65D 81/20* (2013.01);
   (Continued)

(58) Field of Classification Search
   CPC .......... F25D 3/06; F25D 3/08; F25D 2201/14; F25D 2303/0843; F25D 2303/0844;
   (Continued)

(56) References Cited

U.S. PATENT DOCUMENTS 3,018,638 A    1/1962  Winkler
2002/0104318 A1*  8/2002  Jaafar ............... A61J 1/165
                                                    62/3.6
(Continued)

FOREIGN PATENT DOCUMENTS

CN    202800540 U    3/2013
EP    2722618 A2    4/2014
(Continued)

OTHER PUBLICATIONS

Extended European Search Report dated Nov. 28, 2019, issued in counterpart application No. 17795822.0. (9 pages).
(Continued)

*Primary Examiner* — Marc E Norman
*Assistant Examiner* — Schyler S Sanks
(74) *Attorney, Agent, or Firm* — Westerman, Hattori, Daniels & Adrian, LLP

(57) ABSTRACT

The present invention provides a transport container comprising; a first container having a first inner wall with a storage space for storing a transported object and a first outer wall provided on the outside of the first inner wall so as to form, with the first inner wall, a vacuum space therebetween; a first lid that is heat-insulating and is for removably sealing a first opening of the first container; a second container having a second inner wall with a space for storing the first container and the first lid and a second outer wall provided on the outside of the second inner wall so as to form, with the second inner wall, a vacuum space therebetween; a second lid that is heat-insulating and is for remov-
(Continued)

ably sealing a second opening of the second container; and a heat storage material for surrounding the transported object inside the storage space.

13 Claims, 11 Drawing Sheets

(51) Int. Cl.
| | |
|---|---|
| *B65D 81/20* | (2006.01) |
| *F25D 3/08* | (2006.01) |
| *B65D 81/38* | (2006.01) |
| *A01N 1/02* | (2006.01) |
| *A61J 1/16* | (2006.01) |
| *F25D 11/00* | (2006.01) |

(52) U.S. Cl.
CPC ......... *B65D 81/38* (2013.01); *B65D 81/3841* (2013.01); *F25D 3/08* (2013.01); *A61J 1/165* (2013.01); *A61J 2200/40* (2013.01); *A61J 2200/42* (2013.01); *A61J 2200/44* (2013.01); *A61J 2200/72* (2013.01); *F25D 11/003* (2013.01); *F25D 11/006* (2013.01); *F25D 2201/14* (2013.01); *F25D 2303/0843* (2013.01); *F25D 2303/0844* (2013.01); *F25D 2700/121* (2013.01)

(58) Field of Classification Search
CPC ...... A01N 1/0273; B65D 81/18; B65D 81/38; B65D 81/20; B65D 81/3841; A61J 1/165; A61J 2200/44
See application file for complete search history.

(56) References Cited

U.S. PATENT DOCUMENTS

| | | | |
|---|---|---|---|
| 2007/0245763 A1 | 10/2007 | Uchida et al. | |
| 2010/0282762 A1 | 11/2010 | Leonard | |
| 2011/0147391 A1* | 6/2011 | Corder | A61J 1/165 220/592.27 |
| 2014/0054297 A1* | 2/2014 | Patstone | F25D 3/08 220/592.01 |
| 2015/0151893 A1 | 6/2015 | Wengreen et al. | |
| 2015/0232232 A1* | 8/2015 | Shibuki | B65D 25/14 220/592.16 |

FOREIGN PATENT DOCUMENTS

| | | |
|---|---|---|
| JP | 2002-213853 A | 7/2002 |
| JP | 2003-180797 A | 7/2003 |
| JP | 2003-214781 A | 7/2003 |
| JP | 4190898 B2 | 12/2008 |
| JP | 2012-62064 A | 3/2012 |
| JP | 2013-39102 A | 2/2013 |
| JP | 3195655 U | 1/2015 |

OTHER PUBLICATIONS

International Search Report dated May 30, 2017, issued in counterpart application No. PCT/JP2017/010419 (2 pages).

* cited by examiner

TRANSPORT CONTAINER

FIELD OF THE INVENTION

The present invention relates to a transport container, and more particularly to a transport container suitable for transporting a sample or chemical in a predetermined temperature range.

BACKGROUND ARTS

In regenerative medicine, tissues and iPS cells collected from patients and the like are processed according to the purpose of treatment, and the cells thus processed are transplanted to a patient. When such cells and tissues are processed in a Cell Processing Center (CPC), it is necessary to transport the tissues collected from a patient, in a medical institution to the CPC, or to transport the cells processed in the CPC to the medical institution.

When transporting samples such as collected tissues and processed cells, it is required that transport is carried out while maintaining a desired temperature according to the type of sample in order to suppress deterioration of the sample. Also, the sample is transported by various transporting means such as manpower, vehicle and aircraft. Regardless of which transporting means is used, it is required the condition management of the samples including the aforementioned temperature control.

In order to satisfy these requirements, there is proposed, as mentioned below, a transport container where an outer container which is made of a vacuum heat insulating panel is combined with an inner container which installs a heat storage material therein.

PRIOR ARTS

Patent Literature

Patent Literature 1: Japanese Patent No. 4190898

SUMMARY OF INVENTION

Problems to be Solved by the Invention

It is known that, though the vacuum insulation panel exhibits a high thermal insulation performance at the center of the panel, a large thermal leakage occurs at the edge of the panel. Therefore, in a container having a small volume such as a transport container for a sample, the thermal leakage at the end portion is greater than the heat insulating effect at the central portion. Accordingly in the transport container disclosed in Patent Literature 1, a high heat insulating effect cannot be obtained.

In transport containers which are not high in heat insulation properties, a large amount of the heat storage material is required to maintain the temperature for a long time. As a result, the size and weight of the transport container are increased, which is inconvenient for transport. The use of a large amount of the heat storage material makes it difficult to maintain a certain constant temperature in the storage space. Further, when the amount of the heat storage material to be used increases, the time required for prior temperature adjustment becomes longer and manpower is required. Furthermore, many temperature controlling devices are required.

The object of the present invention is to provide a transport container having a high heat-insulating property, thereby reducing the amount of a heat storage material to be used, shortening the pre-treatment time of the heat storage material, and reducing the transportation cost and management manpower.

Means for Solving the Problem

In order to solve the above problem, the present invention is to provide a transport container comprising: a first container having a first inner wall with a storage space for storing a transported object, and a first outer wall provided on the outside of the first inner wall so as to form, with the first inner wall, a vacuum space therebetween; a first lid that is heat-insulating and is for removably sealing a first opening portion of the first container; a second container having a second inner wall with a space for storing the first container and the first lid and a second outer wall provided on the outside of the second inner wall so as to form, with the second inner wall, a vacuum space therebetween; a second lid that is heat-insulating and is for removably sealing a second opening portion of the second container; and a heat storage material for surrounding the transported object inside the storage space.

In the transport container of the present invention having the above configuration, it is preferable that the heat storage material is disposed along an inner peripheral surface of the first container.

In the transport container of the present invention having the above configuration, it is preferable that the heat storage material has a substantially uniform thickness.

Further, it is preferable that, the transport container of the present invention having the above configuration further includes a metal container having thermal conductivity and provided in close contact with an inner peripheral surface of the heat insulating material.

Further, it is preferable that the transport container of the present invention having the above configuration further includes an auxiliary heat storage material provided on a surface of the first lid facing the storage space.

Further, it is preferable that the transport container of the present invention having the above configuration further includes a temperature sensor for measuring the temperature of the heat storage material.

Further, in the transport container of the present invention having the above configuration, it is preferable that the second container accommodates the first container and the first lid in such a manner that a bottom portion of the first container faces the second opening portion of the second container.

Further, in the transport container of the present invention having the above configuration, it is preferable that the first lid has a first sealing material which is in close contact with the first opening portion in such a manner that the first lid is attached to the first opening portion of the first container.

Further, in the transport container of the present invention having the above configuration, it is preferable that the second lid has a second sealing material which is in close contact with the second opening portion in such a manner that the second lid is attached to the second opening portion of the second container.

Further, it is preferable that the transport container of the present invention having the above configuration further includes a third container having a third inner wall with a space for storing the second container and the second lid and a third outer wall provided on the outside of the third inner wall so as to form, with the third inner wall, a vacuum space therebetween; a third lid that is heat-insulating and is for removably sealing a third opening of the third container.

Further, the present invention is to provide a transport container comprising a first container having a first, inner wall with a storage space for storing a transported object and a first outer wall provided on the outside of the first inner wall so as to form, with the first, inner wall, a vacuum space therebetween; a first lid that is heat-insulating and is for removably sealing a first opening portion of the first container; a second container having a second inner wall with a space for storing the first container and the first lid and a second outer wall provided on the outside of the second inner wall so as to form, with the second inner wall, a vacuum space therebetween; and a second lid that is heat-insulating and is for removably sealing a second opening portion of the second container.

Effects of the Invention

When using the transport container of the present invention, it is possible to inhibit the thermal leakage form the transport container to the outside. Thereby, it is possible to reduce the amount of a heat storage material to be used, to shorten the pre-treatment time of the heat storage material, and to reduce the transportation cost and management manpower.

EMBODIMENTS FOR ACHIEVING THE INVENTION

Hereinafter, representative embodiments of the present invention will be described in detail with reference to the drawings, but the present invention is not limited thereto. Since the drawings are for conceptually explaining the present invention, the dimensions, ratios or numbers are exaggerated or simplified in some cases for easy understanding.

In the following description, according to the present invention where samples such as sampled cells and cultured (processed) tissues are transported while being stored in the transport container, other materials such as chemicals which require temperature controlling may be stored in the transport container. In this embodiment, regenerative medicine such as autologous transplantation, in which, for example, a patient's tissue is collected, cells are cultured, and transplanted into the original patient, are typically assumed. In this case, since the cells to be transported are cells for one serving a small amount, the transport container may have a size corresponding to the transported cells. In most cases, the actual storage capacity of the transport container is only 1.0 L to 2.0 L.

First Embodiment

Figure 1:
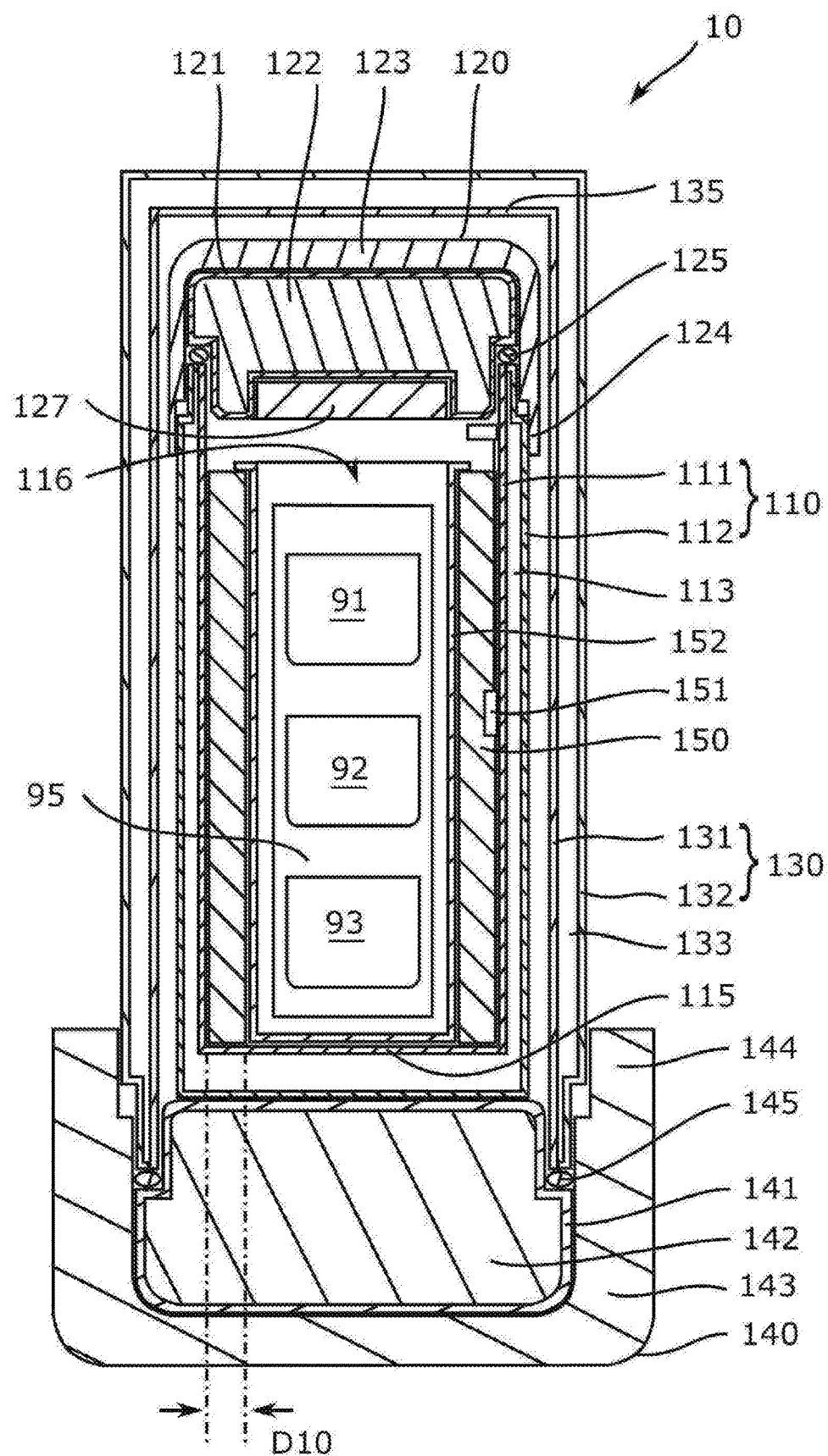
FIG. 1 is a cross-sectional view showing the transport container according to the first embodiment of the present invention.

A transport container 10 according to a first embodiment will be described with reference to FIG. 1 to FIG. 5B. As shown in FIG. 1, the transport container 10 includes an inner container 110, an inner lid 120, an outer container 130, an outer lid 140, a heat storage material 150, a temperature sensor 151, and a storage container 152.

(Inner Container)

The inner container 110 is a tubular container having heat insulating property, and includes an inner wall 111 and an outer wall 112 as shown in FIG. 1. The inner container 110 corresponds to a first container. In the present embodiment, the inner container 110 has a cylindrical shape, but it may have, for example, an elliptical shape or a rectangular parallelepiped shape. The thickness between the two walls on the peripheral surface of the inner container 110 may be appropriately selected according to the desired capacity and processing accuracy of the transport container 10. In the present embodiment, it may be selected from the range of 2 mm to 10 mm, for example. Further, the thickness between the two walls at a bottom portion 115 (the portion to be evacuated) of the inner container 110 may be equal to or greater than the thickness between the two walls on the circumferential surface, and is, for example, around 10 mm in the present embodiment.

The inner wall 111 is a cylindrical metal member and has a storage space 116 on the inner side for accommodating objects to be transported 91 to 93 such as cells. An arbitrary number of objects to be transported may be stored in the storage space 116. Hereinafter, the objects to be transported 91 to 93 may be collectively referred to as a transported object 90. It should be noted that the transported object 90 may be stored in the storage space 116 while being stored in a secondary container 95. Further, in order to protect the transported object 90 from vibrations during transporting, a cushioning material may be provided in a storage space 351.

Figure 2:
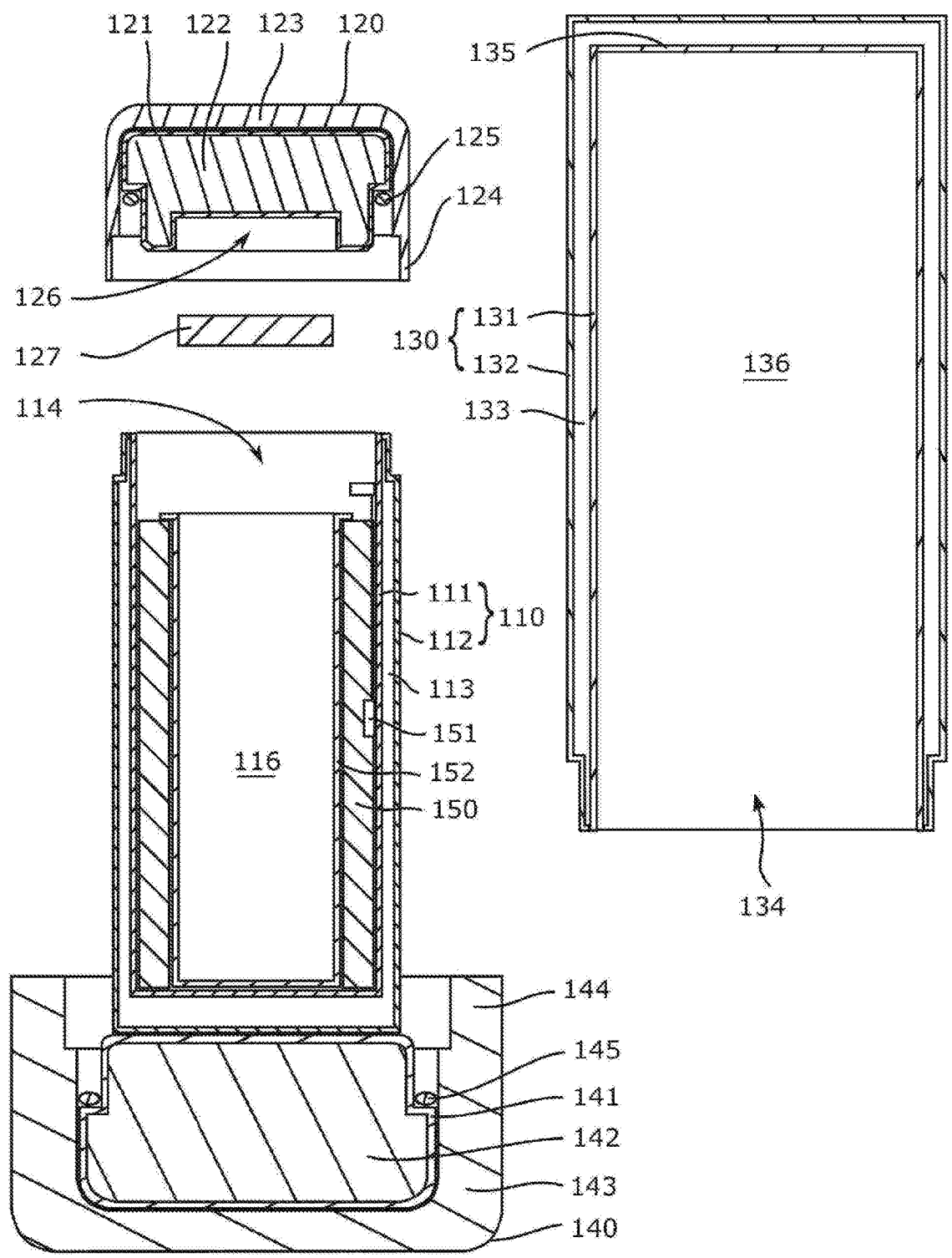
FIG. 2 is an exploded cross-sectional view showing the transport container according to the first embodiment of the present invention.
Figure 3:
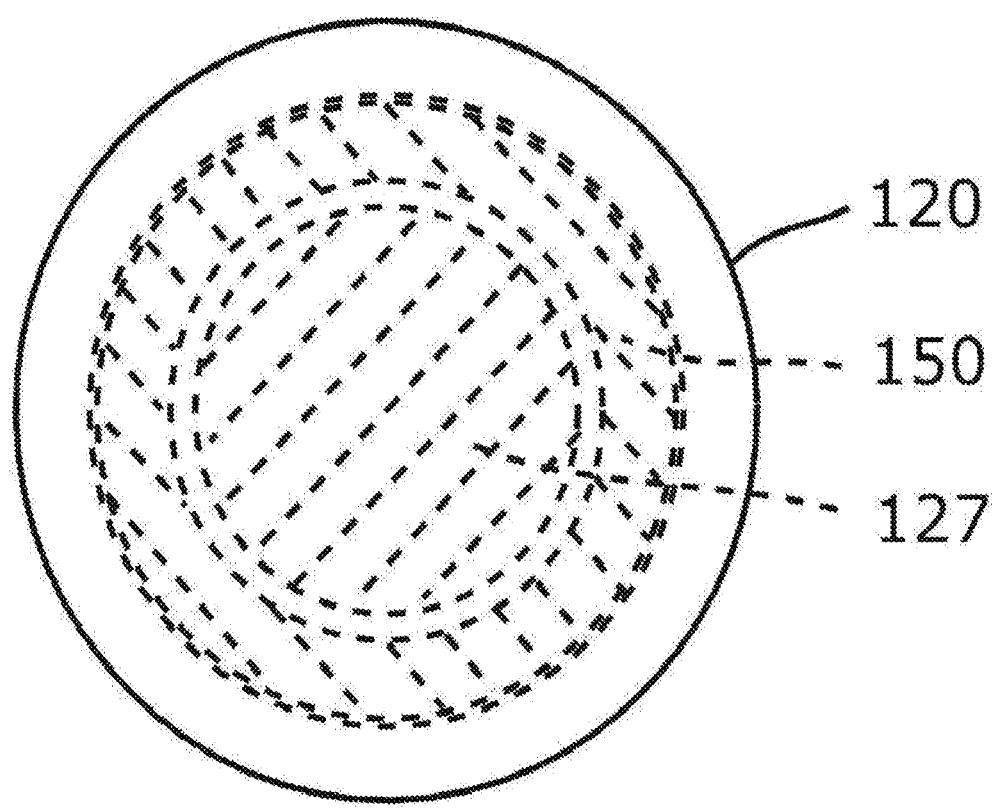
FIG. 3 is an upper view showing the inner container which constitutes the transport container according to the first embodiment of the present invention.

As shown in FIG. 2, the inner wall 111 has an opening portion 114 at one end portion for inserting the transported object 90 into the storage space 116 and for taking out the transported object 90 from the storage, space 116. The inner wall 111 has the bottom portion 115 at the other end portion to cover the other end portion.

In the present embodiment, the inner diameter of the inner wall 111 is substantially uniform from the bottom portion 115 to the opening portion 114. Considering the nature of the transported object 90 to be described later, when the storage volume of the transport container 10 is set to 1.0 L to 2.0 L, for example, in the case of a cylindrical double wall container, it is sufficient that the inner diameter of the inner wall 111 is 80 mm to 150 mm.

A threaded portion (not shown) is formed on an inner peripheral surface of the inner wall 111 in the vicinity of the opening portion 114. The threaded portion can engage with a threaded portion (not shown) formed on the inner lid 120, whereby the inner container 110 and the inner lid 120 are fixed. It should be noted that the threaded portion of the inner wall 111 may be formed on the surface of the outer wall 112 that faces the inner surface of the inner lid 120.

An edge portion which forms the opening portion 114 of the inner wall 111 is in contact with a sealing material 125 provided on the inner lid 120 in the state where the inner lid 120 is fitted in the opening portion 114 of the inner container 110, which results in sealing the storage space 116 of the transport container 1.

The inner wall 111 is formed, for example, by processing a stainless steel into a thin plate of 0.2 mm to 0.7 mm, preferably a thin plate of 0.5 mm or less, apart from the thickness of the portion extended by the press. The stainless steel is a material with a relatively small thermal conductivity.

The outer wall 112 is a cylindrical metal member like the inner wall 111, and is provided so as to cover the outer side of the inner wall 111. The outer wall 112 is joined in the vicinity of the opening portion 114 in the state where the space 113 between the outer wall, and the inner wall 111 is in a reduced pressure. Therefore, the space 113 is a vacuum, and the inner container 110 has a high heat insulating property. In the present embodiment, the outer wall 112 is formed, like the inner wall 111, by processing a stainless steel into a thin plate of 0.2 mm to 0.7 mm, preferably a thin plate of 0.5 mm or less.

In addition, the inner container 110 may have a narrowed portion which protrudes from the inner peripheral surface of the inner wall 111. The narrowed portion is provided in the vicinity of the opening portion 114 of the inner container 110, and improves the heat insulating property of the transport container 10 by reducing the cross-sectional area to contribute to the heat transfer.

(Inner Lid)

The inner lid 120 has heat insulating property and removably seals the opening portion 114 of the inner container 110. The inner lid 120 corresponds to a first lid. In the present embodiment, the movement of heat between the storage space 116 of the inner container 110 and the outside is caused by heat conduction in the stainless steel plate which constitutes the wall material of the inner container 110 and heat transfer through the inner lid 120. In order to ensure the volume of the storage space 116 from 1.0 L to 2.0 L as in the present embodiment, for example, in the case of a cylindrical double-walled container, the inner diameter of the inner container 110 is preferably at least about 10 cm. In this case, since the ratio of the heat insulating property of the inner lid 120 to the heat insulating property of the inner container 110 becomes large, it is necessary to improve the heat insulating property of the inner lid 120. Considering the above, as shown in FIG. 1, the inner lid 120 in the present embodiment includes an inner plug 121, a heat insulating material 122, a cap 123, and the sealing material 125.

However, as long as a desired heat insulating performance required to the inner lid 120 is ensured, for example, the inner plug 121, the heat insulating material 122, and the cap 123 may be integrally formed. Also, the inner lid 120 may be provided with a known internal pressure releasing mechanism. In addition, a relay wiring for taking out the temperature sensor signal ma be built in by connecting a connector of a temperature sensor 151 of the inner container 110 at one end and connecting to a temperature display unit (not shown) installed at an outer lid 140 at the other end.

The inner lid 120 is constituted by the inner plug 121 and the cap 123, and may be constituted separately or may be constituted integrally. In side of the inner plug 121, there is provided a heat insulating urethane foam and a polystyrene foam inside. The inner plug 121 has a portion which enters the inner container 110 and is in close contact with the inner container 110. For example, a threaded portion (not show for fixing the inner plug 121 to the inner container 110 is formed in the cap 123 and engages with a threaded portion (not shown) formed on the outer periphery of the inner container 110 to bring the inner plug 121 into close contact with the inner container 110. The inner lid 120 has an outer diameter equal to or slightly larger than the outer diameter of the inner container 110 in order to accommodate in the outer container 130. The cap 123 itself may be made of a heat insulating material such as a polypropylene foam.

In the state where the inner lid 120 is fitted in the opening portion 114 of the inner container 110, the sealing material 125 is in contact with the edge portion which forms the opening portion 114 to seal the storage space 118 of the inner container 110. The sealing material 125 is, for example, an annular (packing) gasket, and is attached to the inner plug 121 so as to be in contact with a step formed on the outer surface of the inner plug 121. Alternatively, in the case where there is the narrowed portion which protrudes from the inner peripheral surface of the inner wall 111 in the vicinity of the opening portion of the inner container 110, the sealing material 125 may be provided in the narrowed portion.

For example, when transporting a sample by an aircraft, there is a possibility that changes in barometric pressure caused by ascent and descent of the aircraft may affect the quality of the sample unless the barometric pressure inside the transport container is maintained. Therefore, the sealing material 125 is provided on the inner lid 120 so that the airtightness in the transport container 10 is ensured in the state where the inner lid 120 is engaged with the inner container 110.

Referring again to the cap 123, the cap 123 has an extended portion 124 which extends along the outer peripheral surface of the inner container 110 in the state where the inner lid 120 is fitted in the opening portion 114 of the inner container 110. The extended portion 124 is for extending the heat transfer creeping distance described below, in other words, it can be said to be a creeping portion.

A sealing mechanism may be provided so that the edge which forms the opening portion 114 of the inner container 110 and the seal material 125 are securely in close contact with each other. The sealing mechanism includes, for example, two hook-shaped members attached, to the outer surface of the inner lid 120 and two annular members attached to the outer surface of the inner container 110 corresponding to the hook-like members. By energizing the annular member in the direction opposite to the hook-like member in the state where the annular member is engaged with each of the hook-like members, the sealing mechanism can securely seal the storage space 110.
(Outer Container)

The outer container 130 is a double-walled container for accommodating the inner container 110 and has heat insulating property similarly to the inner container 110. The outer container 130 corresponds to a second container. In the present embodiment, the outer container 130 has a cylindrical shape, but it may be, for example, an elliptical shape or a rectangular parallelepiped shape. As shown in FIG. 1, the outer container 130 includes an inner wall 131 and an outer wall 132.

The inner wall 131 is a cylindrical metal member like the inner wall 111 of the inner container 110 and has a space 136 for accommodating the inner container 110. As shown in FIG. 2, the inner wall 131 has an opening portion 134 at one end for inserting the inner container 110 into the inside and for taking out the inner container 110 from the inside. The inner wall 111 has a bottom portion 135 at the other end portion to cover the other end portion.

The inner wall 131 has an inner diameter larger than the outer diameter of the inner container 110 so as not to contact the inner container 110 in the state where the inner container 110 is inserted into the space 136. However, it is preferable that the distance between the inner peripheral surface of the inner wall 131 and the outer peripheral surface of the inner container 110 is short so as to suppress the increase in the size, weight, and decrease in the heat insulating performance of the transport container 10.

The outer wall 132 is a cylindrical metal member like the inner wall 131 and is provided so as to cover the outer side of the inner wall 131. Like the outer wall 112 of the inner container 110 the outer all 132 is joined in the vicinity of the opening portion 134 in the state where the space 133 between the outer wall and the inner wall 131 is in a reduced pressure. Therefore, the space 133 is a vacuum, and the outer container 130 has a high heat insulating property.

The inner wall 131 and the outer wall 132 are formed, like the inner wall 111 and the outer wall 112 of the inner container 110, by processing a stainless steel into a thin plate of 0.2 mm to 0.7 mm, preferably a thin plate of 0.5 mm or less. In addition, the thickness between both walls of the outer container 130 may be appropriately selected according to the desired capacity of the transport container 10 and the processing accuracy, like the inner container 110.
(Outer Lid)

The outer lid 140 may be fixedly formed integrally with the bottom portion of the inner container 110 by fitting or adhesion (see FIG. 2) or separately. For the handling, it is easier for the storage work to be integrated with the inner container 110. Further, it is possible to make the heat transfer creeping distance mentioned bellow long. In the following, the case where the outer lid 140 is integral with the bottom portion of the inner container 110 will be explained.

The outer lid 140 is a heat insulating member for removably sealing the opening portion 134 of the outer container 130. The outer lid 140 corresponds to a second lid. As shown in FIG. 1, the outer lid 140 includes an inner plug 141, a heat insulating material 142, a cap 143, and a sealing material 145. The inner plug 141, the heat insulating material 142, the cap 143, and the sealing material 145 are respectively made of the same material as the inner plug 121, the heat insulating material 122, the cap 123, and the sealing material 125 of the inner container 110. However, as long as a desired heat insulating performance to the outer lid 140 is ensured, for example, the inner plug 141, the heat insulating material 142, and the cap 143 may be integrally formed, as in the inner lid 120.

The outer lid 140 may be fixed to the bottom surface of the inner container 110 as described above. In this case, the inner container 110 is accommodated in the outer container 130 in the state where the inner lid 120 is disposed on the bottom portion 135 side of the outer container 130. Alternatively, the inner container 110 is accommodated in the space 136 of the outer container 130 in the state where the bottom portion 115 faces the opening portion of the outer container 130 or the outer lid 140. Therefore, it is possible to ensure a long heat transfer creeping distance, and thus the heat insulating performance is improved. Here, the heat transfer creeping distance is defined as the distance from the heat storage material 150 to the outside along the inner surface and the outer surface of the inner container 110 and the outer container 130.

A mechanism for performing temperature recording and display, for example, a data logger may be incorporated in the outer lid 140, and by connecting a wiring of the temperature sensor 151 of the inner container 110 to the mechanism, it is possible to record or display the inside temperature of the container during transporting.

Figure 8:
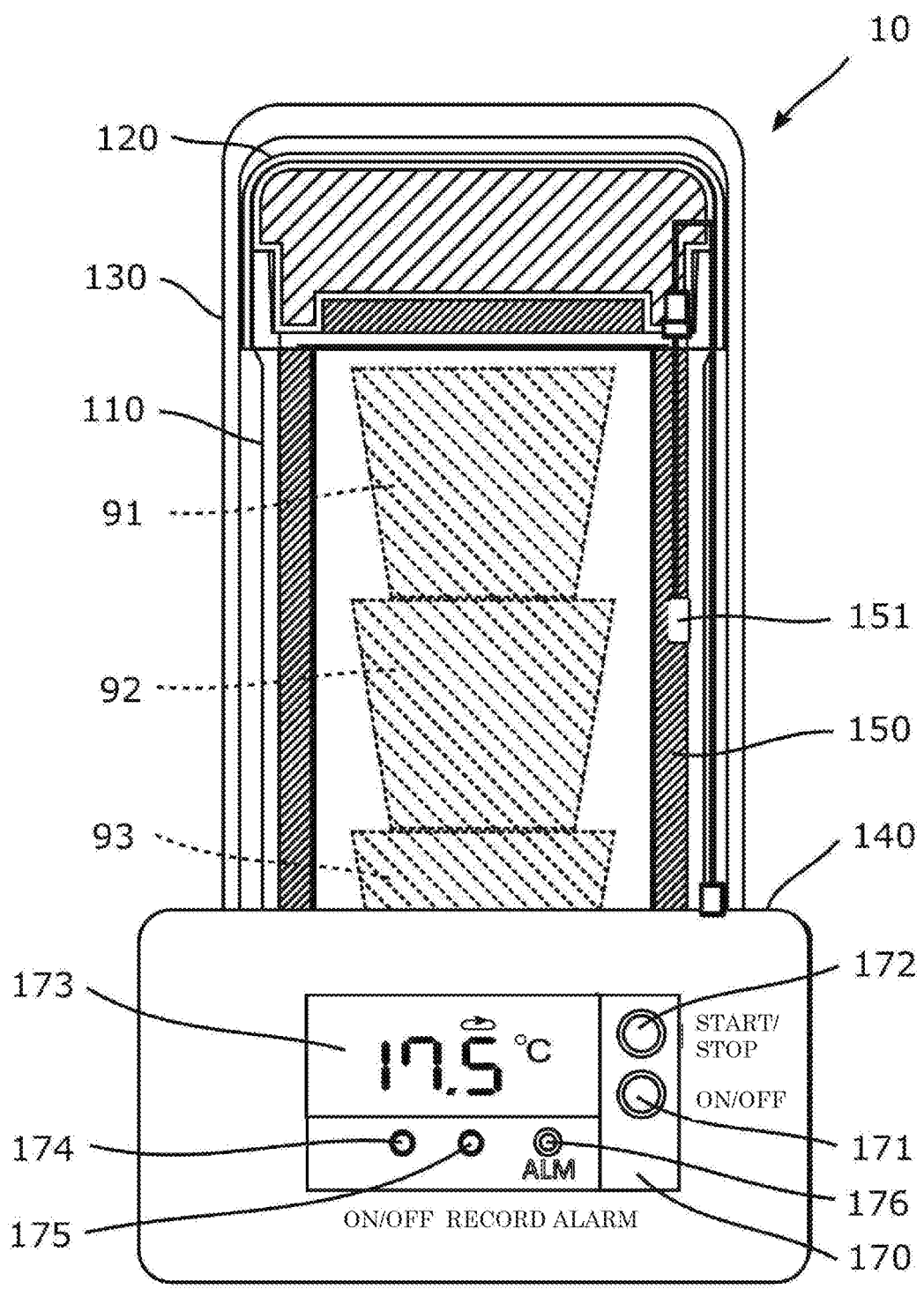
FIG. 8 is a view showing one example of the data logger to be applied to the transport container according to the first embodiment and the second embodiment of the present invention.

An example of the data logger is shown in FIG. 8. In FIG. 8, the internal structure of the transport, container 10 excluding the outer lid 140 is represented by a solid line. A data logger 170 is connected to to the wiring connector of the temperature sensor 151 and records and displays the results of the measurement of the temperature sensor 151. The data logger 170 includes, for example, a power ON/OFF button 171, a recording start/stop button 172, an inside temperature display part 173, a power ON/OFF display part 174, a recording display part 175, an alarm display part 178, and a recording part (not shown) and a built-in power supply (not shown). When the power ON OFF button 171 is pressed, the data logger 170 is energized, and the power ON/OFF display part 174 lights up. When the start/stop button 172 is pressed in this state, the data logger 170 starts to record the inside temperature, the recording display part 175 lights up, and the inside temperature is displayed in the inside temperature display part 173. At that time, if, for example, the inside temperature exceeds a preset transporting temperature, the alarm display part 176 is turned on to call attention to the operator. As a result, it is easy for the operator to manage the transported articles, particularly the temperature controlling.

On the outer peripheral surface of the outer container 130, a grasping part for grasping by an operator may be provided. Like the inner container 110, a sealing mechanism may be provided so that, the edge which forms the opening portion 134 of the outer container 130 and the sealing material 145 securely comes into close contact with each other, thereby sealing the space 136. Note that the inside of the outer container 130 is not necessarily sealed. Threading engagement may be to such an extent that air does not flow into the outer container 130.
(Heat Storage Material)

The heat storage material 150 is, for example, a latent heat storage material, and utilizes heat absorption or heat, generation due to the phase change to maintain the temperature around the heat storage material in the vicinity of the phase change temperature. The heat storage material 150 is disposed along the inner peripheral surface of the inner wall 111 of the inner container 110. The heat storage material 150 may be disposed so as to cover the bottom portion 115 of the inner container 110.

In order to facilitate the heat storage treatment mentioned bellow and to keep the temperature in the storage space 116 within a certain range during the transporting, the heat storage material 150 has a substantially uniform thickness D10 from the bottom portion 115 of the inner wall 111 to the vicinity of the opening portion 114. Here, the substantially uniform thickness is synonymous with the fact that the time required for the heat storage treatment of the heat storage material 150 is approximately the same regardless of the part of the heat storage material 150.

The heat storage material 150 is, for example, a paraffin-based or fatty acid-based hydrocarbon material such as a normal paraffin. In this type of heat storage material, by mating the composition of the material different, it is possible to obtain a heat storage material that stores heat in the specific temperature range within the range, for example, of 0° C. to 50° C. Thereby, it possible to maintain the temperature in the storage space 116 at a desired temperature from the refrigeration temperature to a temperature close to the body temperature. The heat storage material 150 may be a material other than the hydrocarbon based material. Further, it is also possible to use a heat storage material in a freezing region where the phase change is 0° C. or less, dry ice, or the like.

The heat storage material 150 is formed in a sheet-like or a plate-like and has a substantially uniform thickness. The heat storage material 150 may previously be formed in a cylindrical shape. Farther, the heat storage material 150 is solid after the heat storage, and gel-like before the heat storage. It is preferable that the heat storage material 150 can retain its shape as a single body without the storage container 152 mentioned bellow. When using the heat storage material 150, the heat storage material 150 having a size corresponding to the size of the storage space 116 of the transport container 10 is prepared, and the heat storage material 150 of an appropriate size is installed around the transported object 90.

The heat storage material 150 may be heat-stored by a temperature controlling device 16 which is mentioned bellow. For example, when the temperature of the normal paraffin-based heat storage material 150 having a thickness of 2 cm and a weight of 236 g is controlled from 25° C. to 18° C. by the temperature controlling device 16 in the state of being stored in the inner container 110, the time required for temperature controlling to the transporting temperature is about 2 hours.

As a comparative example, when temperature-controlling a plate-like normal paraffin based heat storage material having a thickness of 2 cm and a weight of 236 g in a refrigerator whose inside temperature is maintained at 10° C., it takes at least 9 hours to 10 hours for temperature-controlling to the heat storage temperature and to the transporting temperature. In this way, it takes a lot of time to gently control the temperature at a temperature relatively close to the transporting temperature.

Further, when the above-described normal paraffin-based heat storage material is temperature controlling in a refrigerator maintained at, for example, 5° C., the heat storage time can be about 4 hours, but since, in order to control the temperature to the transporting temperature, it takes 1 hour or more, the total time is at least 5 hours or 6 hours. As described above, when the heat storage treatment is performed by increasing the temperature difference with respect, to the phase change temperature, e.g., when the heat storage material 150 having a phase change temperature of 18° C. is subjected to the heat, storage treatment at 0° C. or less, the heat storage treatment time is short. However, at the end of the heat storage treatment, since the temperature is excessively lower than the phase change temperature used for the transporting, it is necessary to return the temperature to a temperature that can be used for transporting, but since the thermal conduction of the heat storage material 150 is small, it takes a lot of time.

Since the heat storage material 150 subjected to the heat storage treatment is solidified and cloudy, it cannot be determined from the appearance whether the heat storage treatment has been completed or not. Therefore, it takes a sufficient time more than necessary to perform the heat storage and the temperature control.

(Auxiliary Heat Storage Material)

As shown in FIG. 2, in the inner plug 121 of the inner lid 120, a recess 126 is formed on the surface of the inner container 120 facing the storage space 116 of the inner container 110, and the auxiliary heat insulating material 131 is removably attached in the recess 126. By providing the heat storage material 127 on the upper surface side of the storage space 116, the temperature distribution in the storage space 116 can be made more uniform, and thus more accurate temperature controlling can be continued. In this respect, since the bottom portion of the inner container 110 is the portion where the heat is most difficult to escape, it is easy to keep the temperature constant even without installing the heat storage material (of course, the heat storage material may be installed at the bottom of the inner container 110). On the other hand, since the opening portion of the inner container 110 is a portion where the heat easily escapes, the effect of installing the heat storage material is high in order to stabilize the inside temperature of the container.

In the present embodiment, the auxiliary heat storage material 127 has a disc shape. The thickness of the auxiliary heat storage material 127 is preferably the same as the thickness of the heat storage material 150 in terms of management of the heat storage treatment. Further, as shown m FIG. 3, the auxiliary heat storage material 127 is desirably a size slightly smaller than the inner diameter of the storage space 116 so that the heat storage treatment can be performed by the temperature controlling device 16 together with the heat storage material 150.

(Temperature Sensor)

A temperature sensor 151 is provided between the inner container 110 and the heat storage material 150. The temperature sensor 151 is, for example, a thermistor or a thermocouple. The temperature sensor 151 measures the temperature of the heat storage material 150 and outputs to an external device such as the temperature controlling device 16, while the heat storage treatment is being performed in the temperature controlling device 16. Thereby, it is possible to appropriately manage the time required for the heat storage treatment.

The temperature sensor 151 measures the temperature on the inner container 110 side of the heat storage material 150. More specifically, the temperature sensor 151 measures the temperature of the surface opposite to a temperature-controlling heat transfer body 161 in the thickness direction of the heat storage material 150. The reason is that, when the phase change temperature of the heat storage material is higher than the outside air in the thickness direction of the heat storage material 150, the heat moves from the inside to the outside, and the above surface is the portion requiring the longest time for the heat storage treatment. The temperature controlling device 16 determines the completion d the heat storage treatment based on the output of the temperature sensor 151.

A plurality of temperature sensors 151 may be provided, so as to measure the temperature at a plurality of portions having different distances from the inner peripheral surface of the heat storage material 150. For example, in the case of a large container, it is possible to perform more precise management of the heat storage treatment.

The temperature sensor 151 may measure the temperature of the heat storage material 150 during transport of the transported object 90. Thereby, it is possible to control the temperature during transporting. A recorder for recording at least one of temperature, vibration, and barometric pressure in the storage space 116 may be disposed in the storage space 116. Thereby, it is easy to manage the environment of the storage space 116.

(Storage Container)

The storage container 152 may be provided so as to be in contact with the inner surface of the heat storage material 150. The storage container 159 is made of, for example, a heat conductive metal member such as aluminum, and has a cylindrical shape in the present embodiment. The storage container 159 is manufactured by shaping a thin plate having a thickness of about 1 mm on which a surface treatment such as the alumite treatment has been applied into a cylindrical shape. A bottom portion that covers the end portion is formed at the end portion on the inner wall 115 side of the storage container 152. Therefore, the storage container 152 forms the storage space 116. It is to be noted that the storage container 152 may have an elliptical shape or a rectangular parallelepiped shape.

The heat storage material 150 is a sheet-like member formed by filling a soft resin film with a gel-like heat storage material. When the heat storage material 150 is inserted into the inner container 110, there is a case that the heat storage material 150 may not be disposed along the inner surface of the inner wall 111 of the inner container 110. In this case, by inserting the storage container 152 into the inside of the heat storage material 150, the heat storage material 150 is surely disposed along the inner wall 111 of the inner container 110.

Figure 5A:
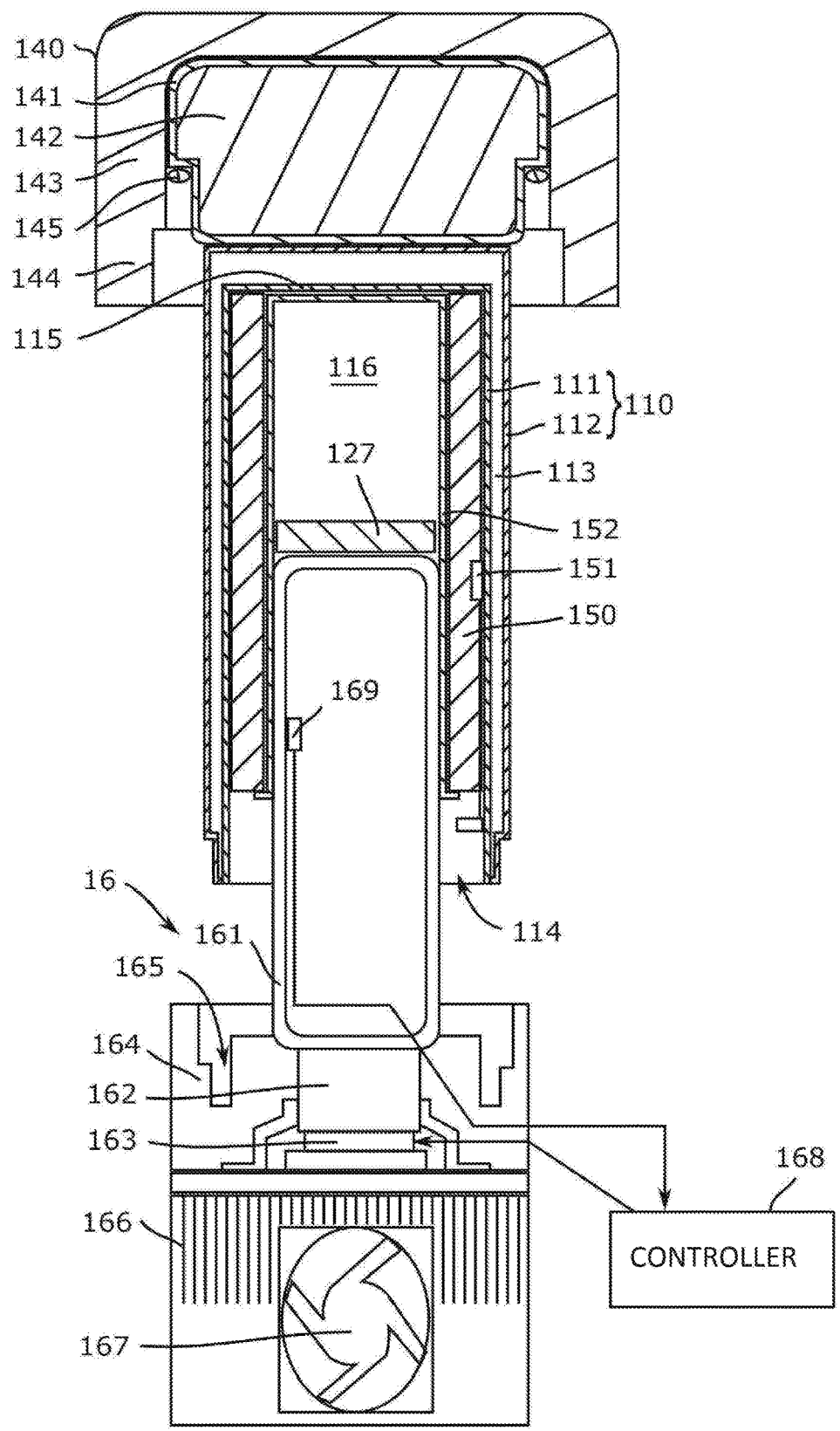
FIG. 5A is a diagrammatic view showing the state where the temperature controlling device is mounted on the transport container according to the first embodiment of the present invention.
Figure 5B:
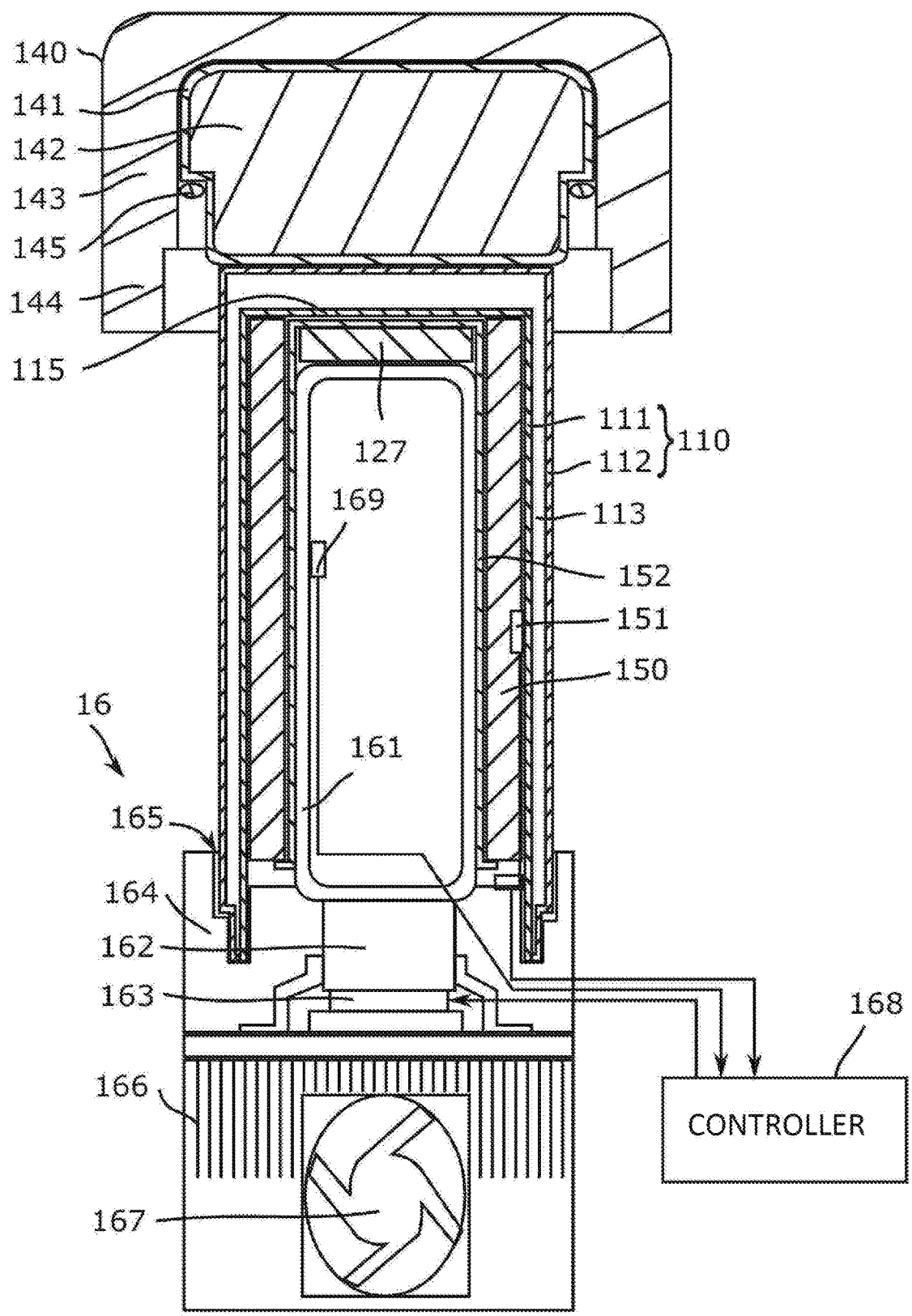
FIG. 5B is a view showing the state where the temperature controlling device is mounted on the transport container according to the first embodiment of the present, invention.

The storage container 152 further has a function that the heat can be uniformly transferred from a temperature controlling heat transfer body 161 of the temperature controlling device 16 to the heat storage material 150 during the heat storage treatment of the heat storage material 150. This function contributes to shortening the heat storage treatment of the heat storage material 150. In addition, the storage container 152 has a function that the heat can be uniformly transferred from the heat storage material 150 to the transported object 90 in the storage space 116 when the transported object 90 is transported. This function contributes to maintaining the temperature in the storage space 116 within a certain temperature range. The bottom portion of the storage container 152 is, for example, as shown in FIG. 5B, useful for the heat storage in the auxiliary heat storage material 127. The storage container 152 may be omitted. In this case, the inside of the heat storage material 150 forms the storage space.

(Temperature Controlling Device)

Figure 4:
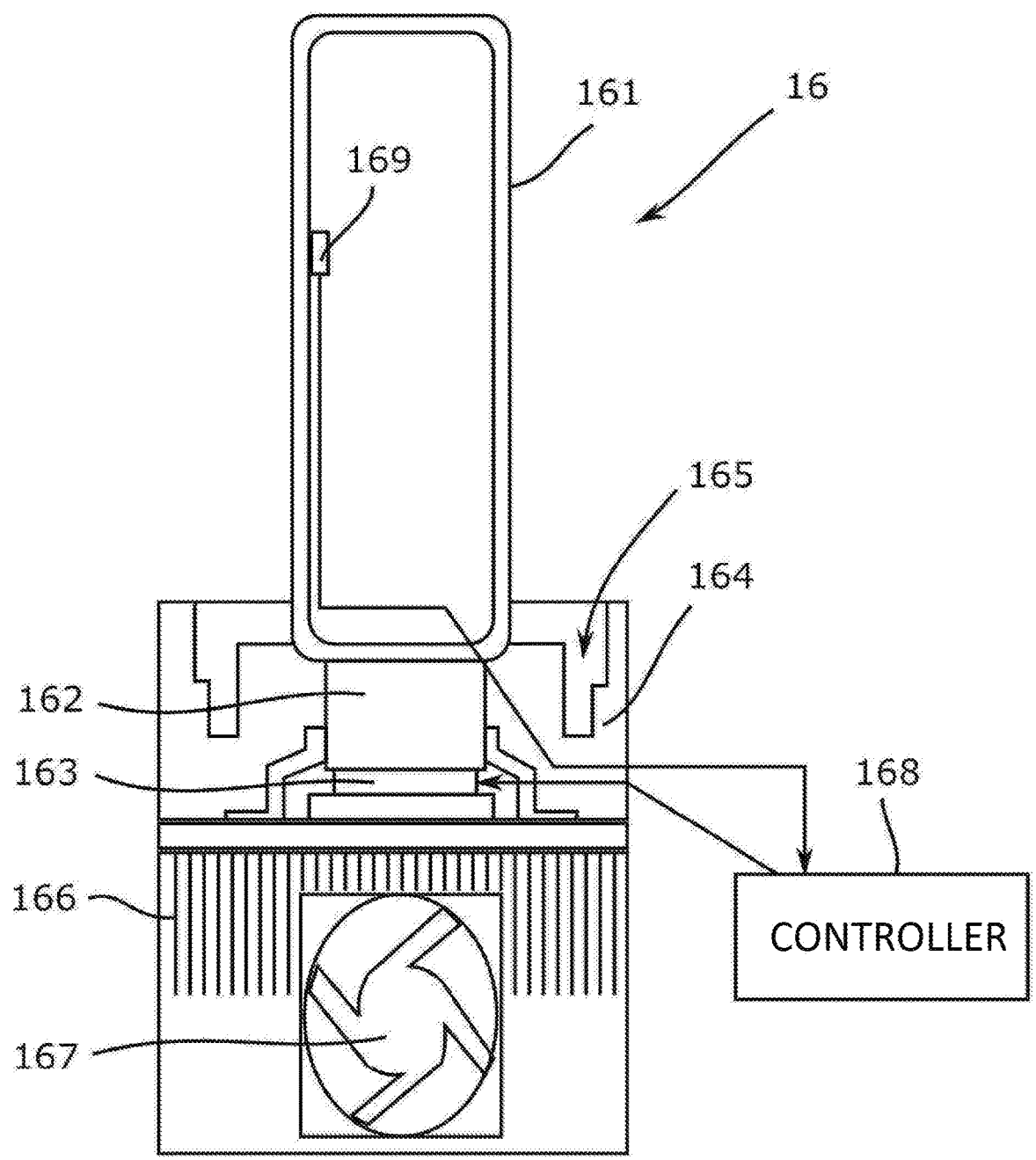
FIG. 4 is a view showing the temperature controlling device which is suitable for the transport container according to the first embodiment of the present, invention.

As described above, in the state where the heat storage material 150 is inserted in the inner container 110, the heat storage treatment can be performed by the temperature controlling device 16. For example, as shown in FIG. 4, the temperature controlling device 18 includes the temperature controlling heat transfer body 161, a heat transfer body 162, a cooling element 163, a radiator 168, a housing 164, a temperature controlling temperature sensor 169 of the temperature controlling heat transfer body 161, and a controller 188.

The temperature controlling heat transfer body 161 is formed, for example, of a metal material having a high thermal conductivity like aluminum. For example, as shown in FIG. 5A, the temperature controlling heat transfer body 161 has an inner diameter slightly smaller than the inner diameter of the storage container 152 so as to be inserted into the storage space 116 along the inner peripheral surface of the storage container 152. In the present embodiment, the temperature controlling heat transfer body 161 has a cylindrical shape so as to conform to the shape of the storage container 152 which forms the storage space 116. In addition, since the temperature controlling heat transfer body 161 is hollow, the heat from the cooling element 163 can be efficiently transferred to the heat storage material 150.

The heat transfer body 162 transfers the heat from the temperature controlling heat transfer body 161 to the cooling element 163, and transfers the heat from the cooling element 163 to the temperature controlling heat transfer body 161. The heat transfer body 162 is fixed to the temperature controlling heat transfer body 161 with, for example, a screw. The cooling element 163 is, for example, a Peltier element, and cools or heats the heat transfer body 162 on the basis of an order from the controller 168. In the temperature controlling of the freezing region, a sterling cooler or the like having a cooler for cooling by a sterling cycle may be used in the same manner.

The heat transfer body 162 and the cooling element 163 mentioned above are housed in a housing 164 having heat insulating property. The housing 164 has a fitting portion 165 into which the opening portion 114 of the inner container 110 is fitted when the heat storage material 150 in the inner container 110 is subjected to heat storage treatment. In the present embodiment, the inner portion of the inner container 110 is hermetically sealed by fitting the opening portion 114 of the inner container 110 to the fitting portion 165 of the temperature controlling device 16, so that the heat leakage during the heat storage treatment is suppressed.

The radiator 166 is, for example, a heat sink and emits the heat in the cooling element 163. A fan 167 discharges the heat emitted from the radiator 166 to the outside of the temperature controlling device 16.

Based on a signal from the temperature sensor 169 for measuring the temperature of the temperature controlling heat transfer body 161, the controller 168 controls the temperature of the temperature controlling heat transfer body 181 at the heat storage treatment temperature, and manages the fact whether or not the heat storage treatment is completed on the basis of the temperature information of, the heat storage material 130 which is output from the temperature sensor 151 of the transport container 10.

(Temperature Controlling Procedures of Heat Storage Material)

Referring to FIG. 5A and FIG. 5B, the procedure for temperature controlling of the heat storage material 150 in the inner container 110 by the temperature controlling device 16 is explained. Here, the explanation is made assuming that the outer lid 140 is fixed to the bottom portion of the inner container 110.

First, the transport container 10 is prepared. The fitting between the outer container 130 and the outer lid 140 is released, and the outer container 130 is removed from the transport container 10. Next, the fitting between the inner lid 120 and the inner container 110 is released, and the inner lid 120 is removed from the inner container 110. In addition, the auxiliary heat storage material 127 is taken out from the recessed portion 126 of the lid 130.

Next, the temperature controlling device 16 is prepared, and, as show in FIG. 5A, the temperature controlling heat transfer body 161 of the temperature controlling device 16 is inserted from the opening portion 114 of the inner container 110 into the storage space 116 (the inside of the storage container 152). At that time, the auxiliary heat storage material 127 is disposed between the temperature controlling heat transfer body 161 and the bottom portion of the storage container 152.

As shown in FIG. 5B, the opening portion 114 of the inner container 110 is fitted into the fitting portion 165 of the temperature controlling device 16, and the cord of the temperature sensor 151 is connected to the controller 168 of the temperature controlling device 16.

After completing the attachment of the inner container 110 to the temperature controlling device 16 in this way, the temperature controlling device 16 is operated to start the heat storage treatment. The controller 168 maintains the temperature of the temperature controlling heat transfer body 161 at the heat storage treatment temperature on the basis of the signal of the temperature sensor 169. At the same time, the controller 168 monitors the state of the heat storage treatment of the heat storage material 150 on the basis of the temperature information from the temperature sensor 151. The controller 168 further controls (cools or heats) the heat storage, material 150 until the temperature of the heat storage material 150 reaches a preset temperature which determines the termination of the heat storage treatment. Thereafter, when the temperature of the storage container 152 side of the heat storage material 150 approaches the transporting temperature, the heat storage treatment is terminated.

When completing the temperature control, the transport container is detached from the temperature controlling device 16, the transported object 90 is inserted into the storage space 116 of the inner container 110, and the inner lid 120 is fitted into the inner container 110. Then, the outer container 130 is put on the inner container 110 from the inner lid 120 side, and fitted into the outer lid 140.

(Other Temperature Controlling Procedure)

As the other procedure for controlling the temperature of the heat storage material 150, the heat storage treatment is conducted by storing only the heat storage material 150 in the refrigerator in the state where the storage shape is maintained before the heat storage material 150 is stored in the inner container 110.

(Effect of the First Embodiment)

According to the present embodiment, the transport container 10 having high heat insulating properties can be provided by the inner container 110 having a high heat insulating property, the inner lid 120 having a high heat insulating property, the outer container 130 having a high heat insulating property, and the outer lid 140 having a high heat insulating property. The transport container 10 makes it possible to maintain the transported object 90 at a desired transporting temperature for a long time. Further, since the thickness of the heat storage material 150 is uniform, the temperature in the storage space 116 can be kept uniform irrespective of places. By increasing the heat transfer creeping distance, the heat insulating property of the container is maintained high, so that the usage amount of the heat storage material 150 can be reduced, and the transport container 10 can be reduced in size and weight.

The heat transfer which is conducted through the container wall surface of the inner container 110 is related to the heat insulating property of the inside of the container. According to the present embodiment, by increasing the heat transfer creeping distance by the wall material of the container, the heat insulating property of the container can be maintained high. Moreover, by adopting the double structure of the inner container 110 and the outer container 130, the heat transfer creeping distance of the inner container 110 can be further lengthened. As a result, it is possible to construct the container having a high heat insulating property.

To give one example, the transport container according to the present embodiment having the following dimensions has a heat insulating performance of 0.016 W/° C. or less, and can realize, a transporting time of 78 hours even when the amount of the heat storage material is one sixth. The mass is only 2.0 kg.

Inner container: Inner diameter 110 mm, Height 240 mm, Volume 2.28 L

Outer diameter 120 mm, Height 260 mm

Outer container: Outer diameter 145 mm, Height 360 mm, Volume 5.5 L

Heat storage material: Diameter 100 mm, Height 220 mm, Mass about 620 g

Storage volume: 1.5 L (Diameter 93 mm, Height 230 mm)

In contrast, in order to keep a storage temperature of 18° C. for 72 hours under an ambient temperature of 40° C., the conventional product used for cell transport has the following dimensions, but a heat insulating performance is up to about 0.192 W/° C. and a mass is 9.9 kg. Moreover, since the heat insulation property is poor, the temperature distribution in the container is large, and the keeping time is further shortened depending on the part.

External dimensions: 386 mm×275 mm×237 mm (capacity 25.1 L)

Internal dimensions: 280 mm×170 mm×152 mm (capacity 7.2 L)

Heat storage material: 3.8 kg

Storage volume 1.6 L (70 mm×90 mm×230 mm)

As explained above, the transport container according to the present embodiment has the same transporting time as that of the conventional product having the same storage volume, regardless of the amount of the heat storage material of the transport container according to the present embodiment being one sixth. In addition, the weight of the entire transport container according to the present embodiment is ⅕ or less of that of the conventional product.

With respect to the heat storage treatment, it is possible to shorten the time of the heat storage treatment by inserting the temperature controlling device 18 into the inner container 110 and directly controlling the temperature of the heat storage material 150. Here, since the heat insulating property of the inner container 110 is high, when the inner container 110 is installed in a temperature controlling device such as a normal refrigerator in the state where the inner heat storage material 150 is inserted therein, the heat storage treating time becomes so long. The present inventors have succeeded to make the temperature controlling time shorten by directly controlling the inside temperature of the inner container 110. In this respect, in the conventional product, the heat storage treatment is performed over 12 hours to 24 hours, but in the present embodiment, it is completed in 3 to 4 hours.

In addition, when the temperature controlling process is performed in the state where the temperature controlling heat transfer body 161 is inserted into the heat storage material 150, the phase change starts from the surface of the heat storage material 150 near the temperature controlling heat transfer body 161, and finally the heat storage treatment is performed on the inner container 110 side. Accordingly, by disposing the temperature sensor 151 between the inner surface of the inner container 110 and the heat storage material 150, it is possible to easily determine the timing of terminating the heat storage treatment. In addition, since the heat storage material 150 has a uniform thickness, and the temperature controlling is performed in the sealed small heat insulation container, the heat storage material 150 can be entirely subjected to the heat storage treatment almost at the same time. Further, since the heat insulating property is very high, the thickness of the heat storage material 150 is thin (it can be provided with a small thickness since the amount thereof is small), and this makes it possible to perform a sufficient heat storage treatment in a short and insufficient heat storage treatment can be avoided.

The auxiliary heat storage material 127 is subjected to the heat storage treatment in the temperature controlling device 16, together with the heat storage material 150. In the present embodiment, since the thickness of the auxiliary heat storage material 127 is formed to be substantially the same as the thickness of the heat storage material 150, when the heat storage treatment to the heat storage material 150 is completed, the heat storage treatment to the auxiliary heat storage material 127 is also completed. Therefore, it is possible to carry out efficient heat storage treatment.

The temperature controlling device 16 is fitted in the opening portion 114 of the inner container 110 in the fitting portion 165. Since the housing 164 in which the fitting portion 165 is formed has the heat insulating properties, the inside of the inner container 110 is insulated from the outside. As a result, the temperature controlling of the inside of the inner container 110 can be efficiently carried out, and the heat storage treatment can be performed.

The temperature controlling device 16 is, for example, an electro cooling type temperature controlling device with a Peltier element, and since the temperature controlling heat transfer body 161 has a hollow container shape, it is possible to change the inside temperature of the inner container 110 to an arbitrary predetermined temperature simply and promptly.

Second Embodiment

Figure 6:
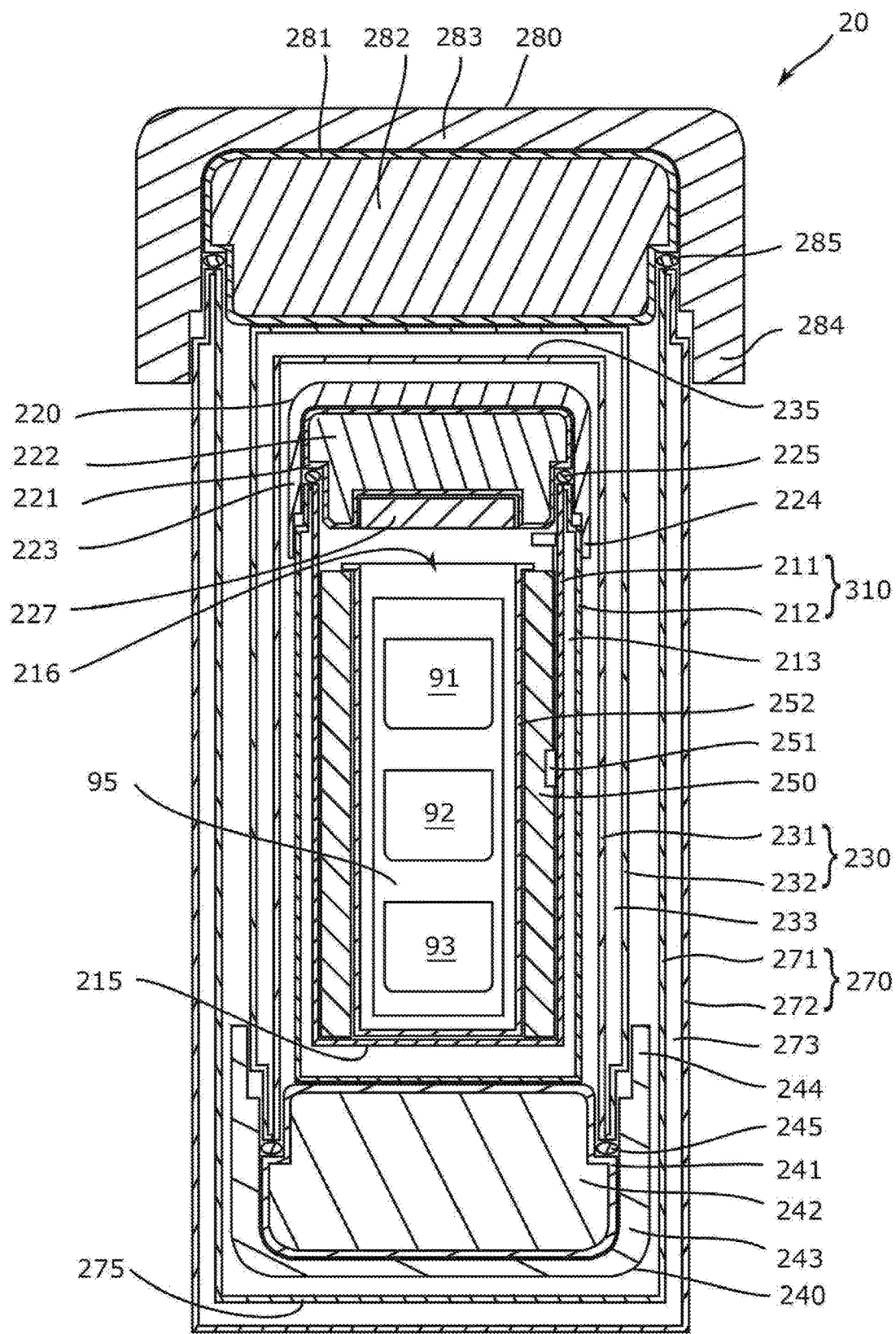
FIG. 6 is a cross-sectional view of the transport container according to the second embodiment of the present invention.

Referring to FIG. 6, a transport container 20 according to the second embodiment is explained. As shown in FIG. 6, the transport container 20 includes an inner container 210, an inner lid 220, a middle container 230, a middle lid 240, an outer container 270, an outer lid 280, a heat storage material 250, a temperature sensor 251, and a storage container 252. The heat storage material 250, the temperature sensor 251 and the storage container 252 are accommodated in the inner container 210, and the inner container 210 and the inner lid 220 are accommodated in the middle container 230, and the middle container 230 and the middle lid 240 are accommodated in the outer container 270, respectively. Namely, the transport container 20 is a triple container. In relation to the scope of claims, the inner container 210, the inner lid 220, the middle container 230, the middle lid 240, the outer container 270 and the outer lid 280 correspond to as the first container, the first lid, the second container, the second lid, the third container and the third lid, respectively.

The inner container 210, the inner lid 220, the middle container 230, the middle lid 240, the heat storage material 250, the temperature sensor 251 and the storage container 252 may be the structural elements corresponding to the inner container 110, the inner lid 120, the outer container 130, the outer lid 140, the heat storage material 150, the temperature sensor 151 and the storage container 152, respectively.

Similar to the inner container 210 and the middle container 230 the outer container 270 has a double wall structure including an inner wall 271 and an outer wall 272. A space 273 between the inner wall 271 and the outer wall 272 is evacuated. A heat insulating material may be inserted in a gap formed between the outer container 270 and the middle container 230.

The outer lid 280 is a heat insulating lid removably fitted in the opening portion of the outer container 270. The shapes and materials of an inner plug 281, a heat insulating material 282, a cap 283 and a sealing material 285 included in the outer lid 280 are the same as those of the inner plug 221, the heat insulating material 222, the cap 223, and the sealing material 225 included in the inner lid 220, respectively. When an extended portion 284 covers the outer peripheral surface of the outer container 270 more largely, the heat insulating performance of the transport container 20 is further improved. The outer lid 280 may be integrated with the inner container 230.

The transfer container 20 having such a triple structure has a very high heat insulating performance, because the heat transfer creeping distance of the inner container 110 is further increased, and it is further possible to lengthen the transporting time per a certain amount of the heat storage material, and to reduce the amount of the heat storage material per a certain transporting time. This also leads to shortening of the temperature controlling time of the heat storage material.

As in the first embodiment, in the transport container 20, a temperature controlling device similar to the temperature controlling device 10 may be applied in order to perform heat storage treatment of the heat storage material 250. The structure and operation of the temperature controlling device are the same as in the first embodiment. Further, as in the first embodiment, a data logger for recording and displaying the inside temperature of the container may be applied to the transport container 20. The data logger is provided, for example, on the outer surface of the outer lid 280.

Figure 7A:
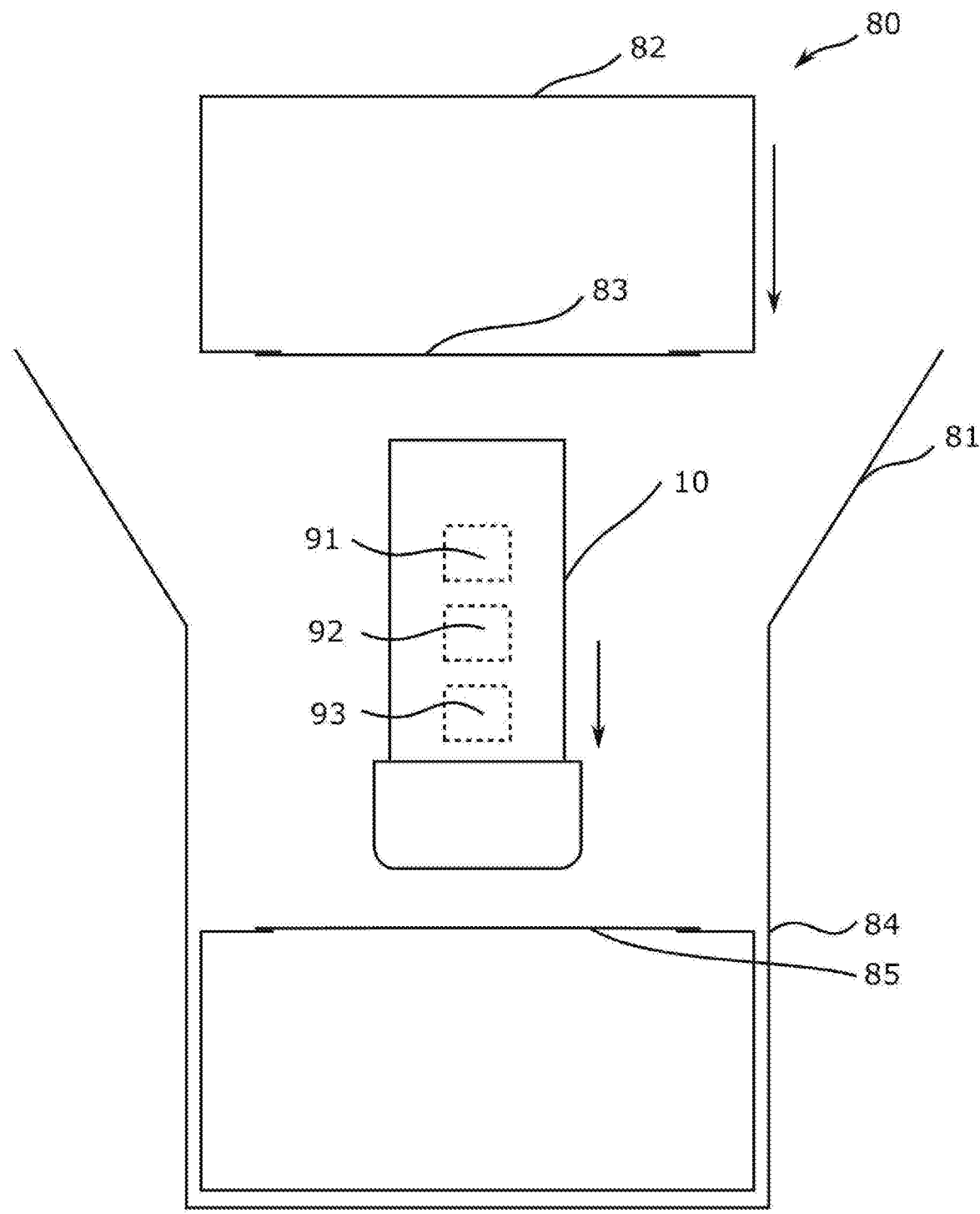
FIG. 7A is a view showing one example of the packaging box to be applied to the transport container according to the first embodiment and the second embodiment of the present invention.
Figure 7B:
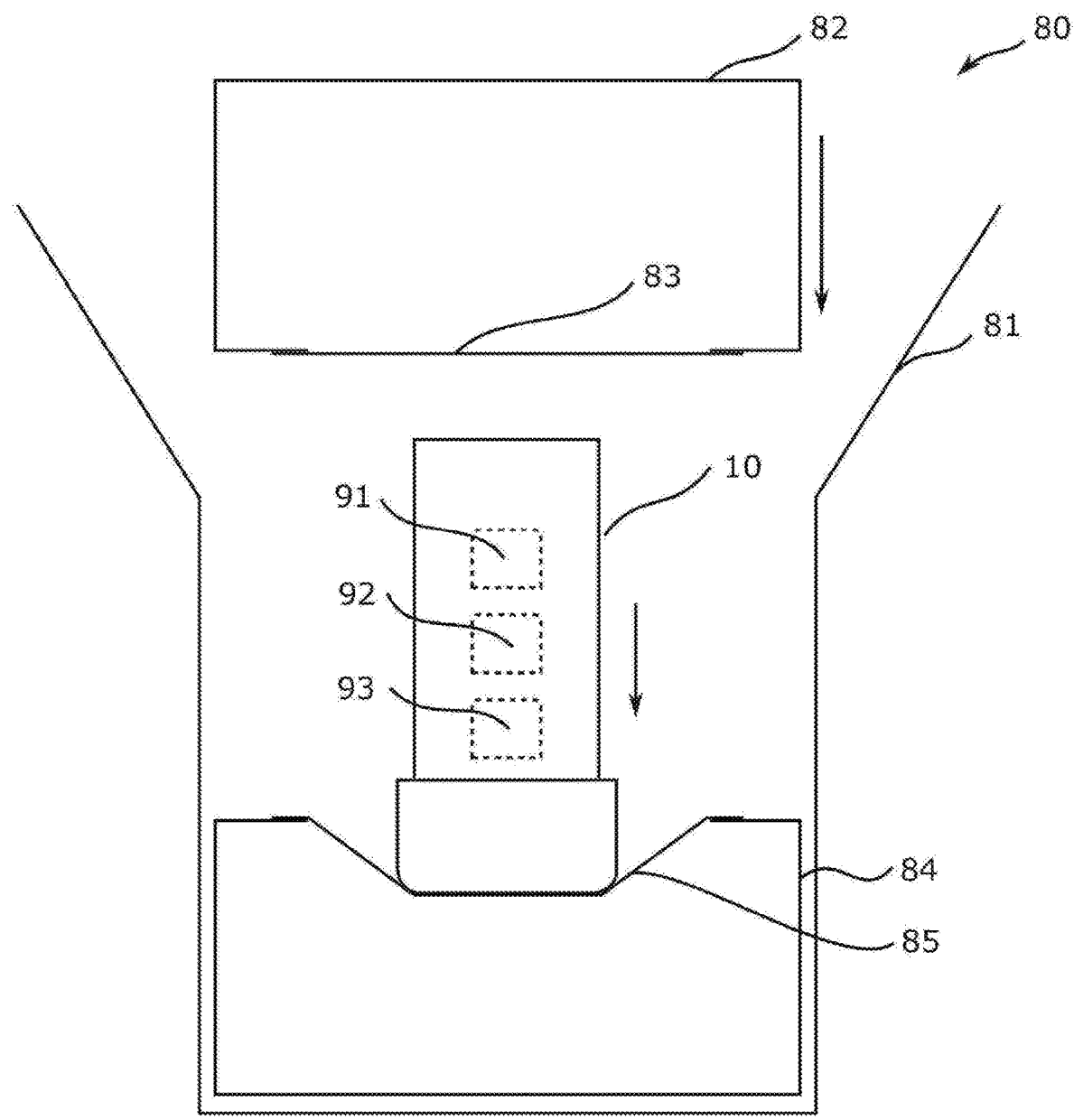
FIG. 7B is a view showing another example of the packaging box to be applied to the transport container according to the first embodiment and the second embodiment d the present invention.
Figure 7C:
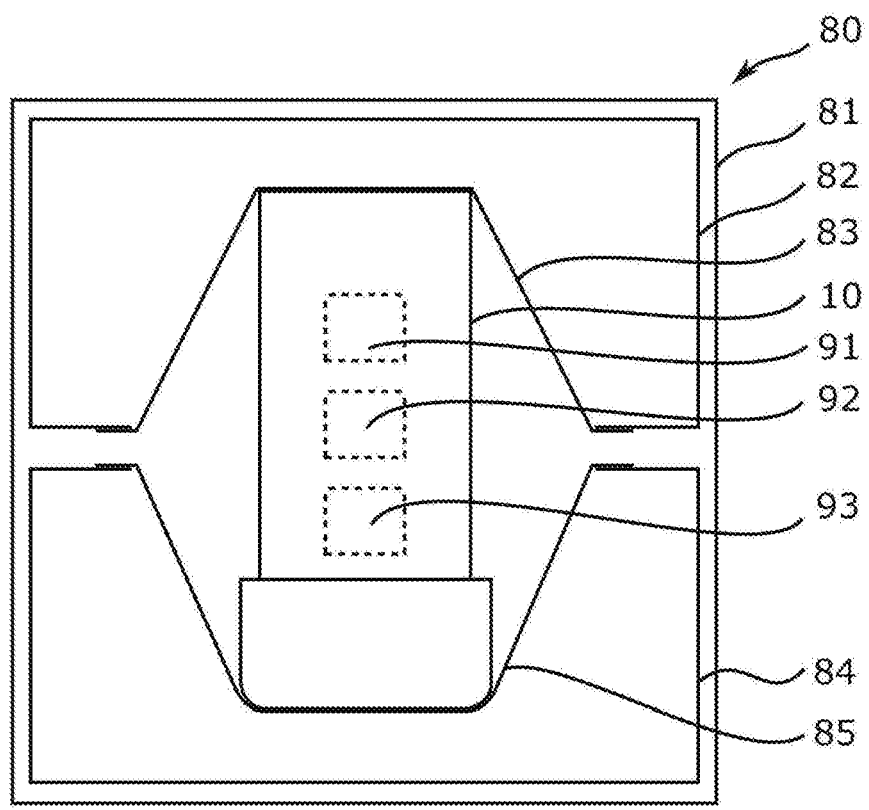
FIG. 7C is a view showing the other example of the packaging box to be applied to the transport container according to the first embodiment and the second embodiment of the present invention.

Since the transport container 10 (20) is small and light, it is preferable to provide the transport container 10 (20) with a packing box provided with a buffer mechanism for protecting the sample stored in the transport container 10 (20) 20) may be stored or disposed and transported. FIG. 7A to FIG. 7C illustrate embodiments in which the transport container 10 is transported by a packing box 80 which is transported while being sandwiched by films 83 and 85 having elasticity.

The packing box 80 includes an outer box 81, inner boxes 82, 84 accommodated in the outer box 81, the elastic films 83, 85 provided on the inner boxes 82, 84 on the surface facing the transport container 10. When the inner boxes 82 and 84 are packed with the outer box 81 in the state of holding the transport container 10 as shown in FIG. 7A to FIG. 7C, the films 83 and 85 absorb the impact applied to the transport container 10 during transportation. As a result, the transported objects 91 to 93 in the transport container 10 are protected from the shock during transportation.

EXPLANATION OF SYMBOLS 10, 20 Transport container
16 Temperature controlling device
110, 210 Inner container
120, 220 Inner lid 127, 227 Auxiliary thermal storage material
130, 270 Outer container
140, 280 Outer lid
150, 250 Heat storage material
151, 251 Temperature sensor
152, 252 Storage container
230 Middle container
240 Middle lid.

The invention claimed is:

1. A transport container comprising:
a first container having a first inner wall with a storage space for storing a transported object, and a first outer wall provided on the outside of the first inner wall so as to form, with the first inner wall, a vacuum space therebetween;
a first lid that is heat-insulating and is for removably sealing a first opening portion of the first container;
a second container having a second inner wall with a space for storing the first container and the first lid and a second outer wall provided on the outside of the second inner wall so as to form, with the second inner wall, a vacuum space therebetween;
a second lid that is heat-insulating and is for removably sealing a second opening portion of the second container; and
a heat storage material for surrounding the transported object inside the storage space,
wherein the first container has a bottom portion, and the vacuum space formed between the first inner wall and the first outer wall communicates with a vacuum space in the bottom portion of the first container,
wherein the second container has a bottom portion, and the vacuum space formed between the second inner wall and the second outer wall communicates with a vacuum space in the bottom portion of the second container,
wherein the second container accommodates the first container and the first lid in such a manner that the bottom portion of the first container faces the second opening portion of the second container, and
wherein the first opening portion and the second opening portion are on opposite ends of the transport container.

2. The transport container according to claim 1, wherein the heat storage material is disposed along an inner peripheral surface of the first container.

3. The transport container according to claim 2, wherein the heat storage material has a substantially uniform thickness.

4. The transport container according to claim 2, further comprising a metal container having thermal conductivity and provided in contact with an inner peripheral surface of the heat insulating material.

5. The transport container according to claim 1, further comprising an auxiliary heat storage material provided on a surface of the first lid facing the storage space.

6. The transport container according to claim 1, further comprising a temperature sensor for measuring the temperature of the heat storage material.

7. The transport container according to claim 1, wherein the first lid has a first sealing material which is in contact with the first opening portion in such a manner that the first lid is attached to the first opening portion of the first container.

8. The transport container according to claim 1, wherein the second lid has a second sealing material which is in contact with the second opening portion in such a manner that the second lid is attached to the second opening portion of the second container.

9. The transport container according to claim 1, further comprising a temperature controlling device removably mounted in the storage space and performing a heat storage treatment on the heat storage material.

10. The transport container according to claim 1, further comprising:
a third container having a third inner wall with a space for storing the second container and the second lid and a third outer wall provided on the outside of the third inner wall so as to form, with the third inner wall, a vacuum space therebetween;
a third lid that is heat-insulating and is for removably sealing a third opening portion of the third container.

11. A transport container comprising:
a first container having a first inner wall with a storage space for storing a transported object and a heat storage material, and a first outer wall provided on the outside of the first inner wall so as to form, with the first inner wall, a vacuum space therebetween;
a first lid that is heat-insulating and is for removably sealing a first opening portion of the first container;
a second container having a second inner wall with a space for storing the first container and the first lid and a second outer wall provided on the outside of the second inner wall so as to form, with the second inner wall, a vacuum space therebetween;
a second lid that is heat-insulating and is for removably sealing a second opening portion of the second container,
wherein the first container has a bottom portion, and the vacuum space formed between the first inner wall and the first outer wall communicates with a vacuum space in the bottom portion of the first container,
wherein the second container has a bottom portion, and the vacuum space formed between the second inner wall and the second outer wall communicates with a vacuum space in the bottom portion of the second container,
wherein the second container accommodates the first container and the first lid in such a manner that the bottom portion of the first container faces the second opening portion of the second container, and
wherein the first opening portion and the second opening portion are on opposite ends of the transport container.

12. The transport container according to claim 1, wherein the second lid is fixedly formed integrally with the bottom portion of the first container.

13. The transport container according to claim 11, wherein the second lid is fixedly formed integrally with the bottom portion of the first container.

* * * * *